Jan. 10, 1956 L. E. WUNDERWALD ET AL 2,730,150
STORAGE BINS
Filed Oct. 26, 1953 4 Sheets-Sheet 1

Leon E. Wunderwald,
Richard L. Rosebrough,
Inventors
Koenig and Pope,
Attorneys.

Jan. 10, 1956  L. E. WUNDERWALD ET AL  2,730,150
STORAGE BINS
Filed Oct. 26, 1953  4 Sheets-Sheet 2
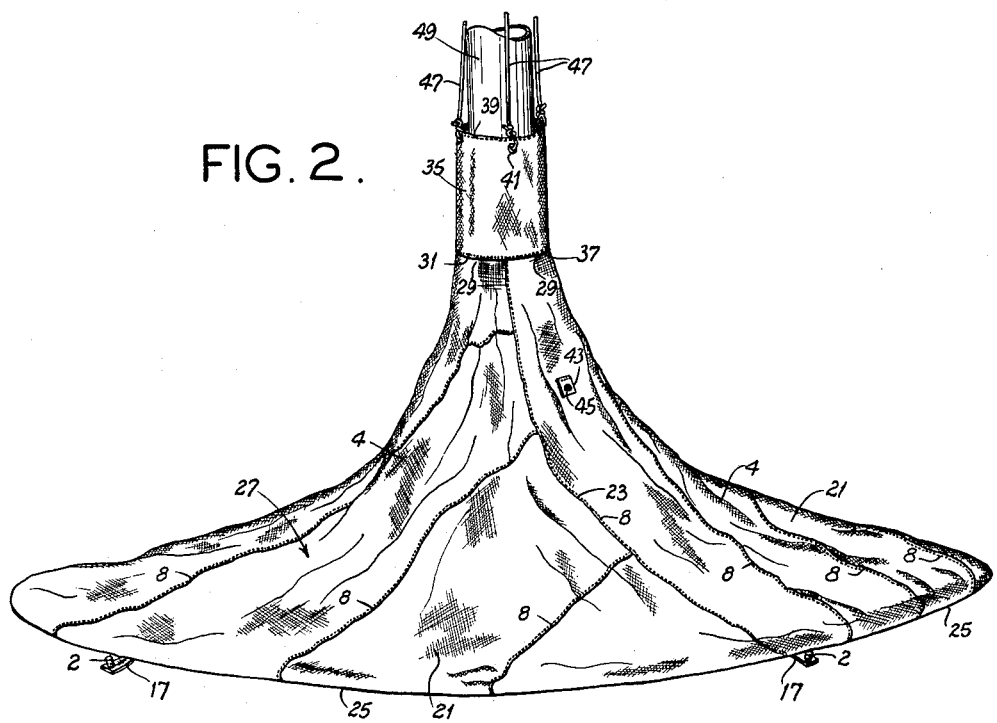
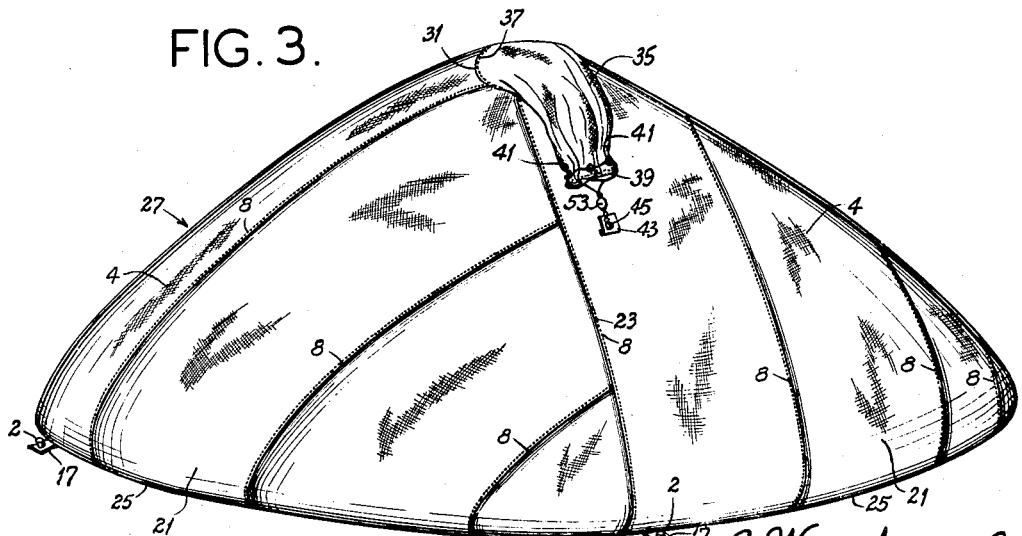

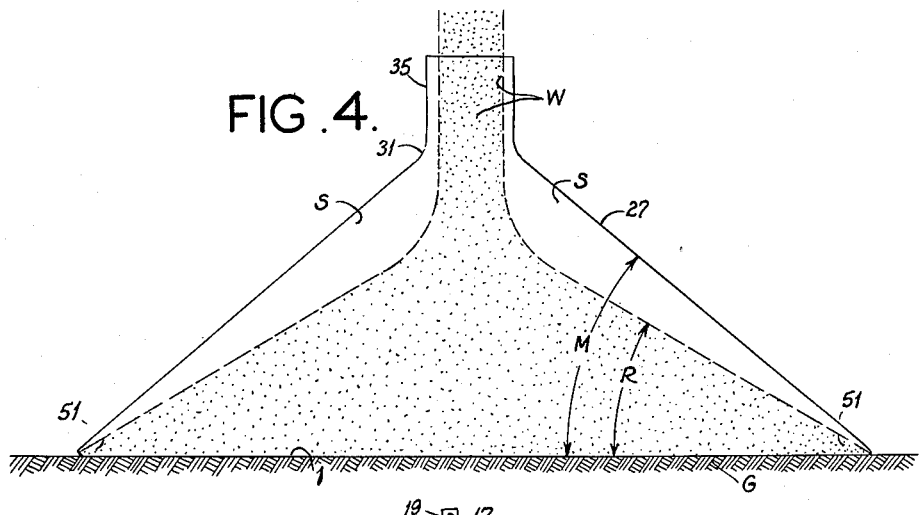
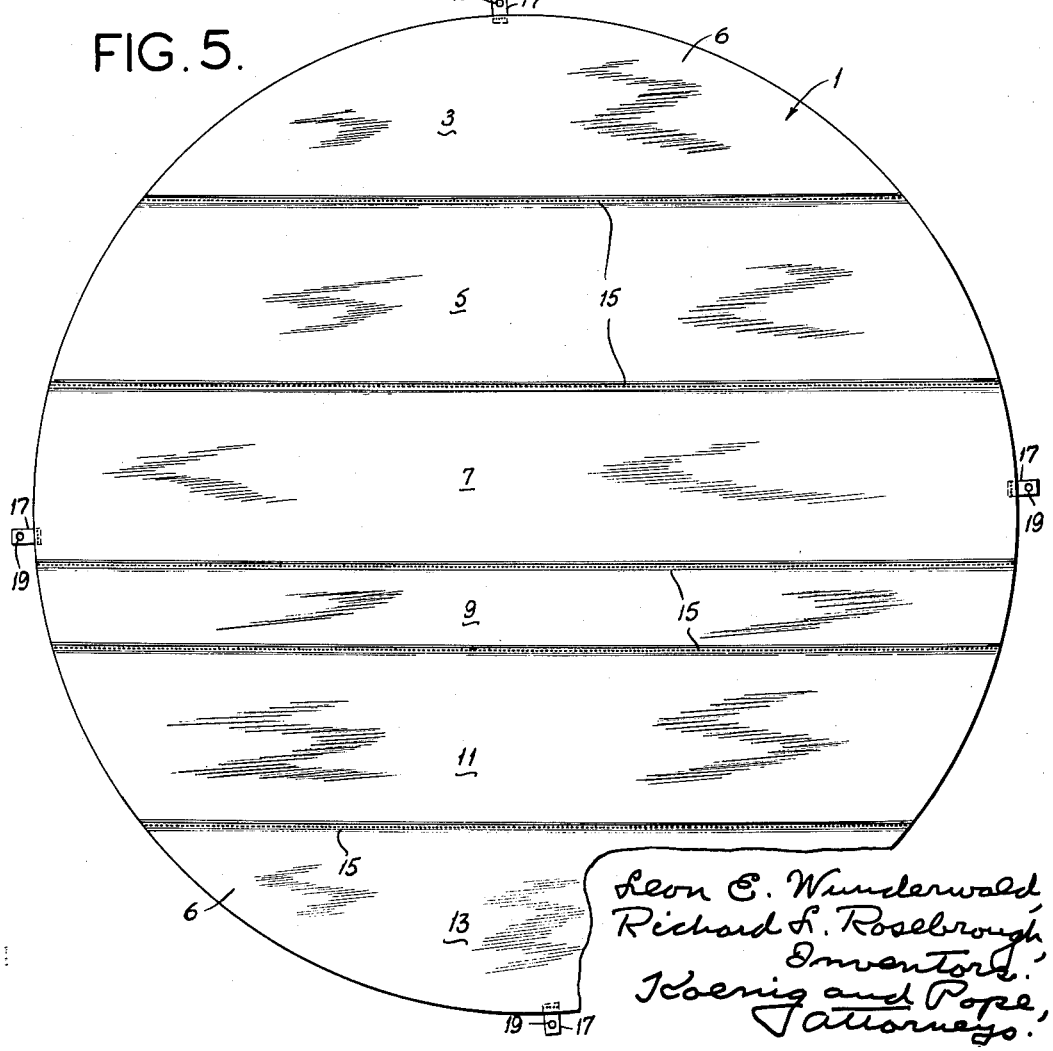

United States Patent Office 2,730,150
Patented Jan. 10, 1956

2,730,150

STORAGE BINS

Leon E. Wunderwald, Great Falls, Mont., and Richard L. Rosebrough, Webster Groves, Mo.; said Rosebrough assignor to Bemis Bro. Bag Company, St. Louis, Mo., a corporation of Missouri Application October 26, 1953, Serial No. 388,100

6 Claims. (Cl. 150—.5)

This invention relates to storage bins, and with regard to certain more specific features, to flexible erectile and collapsible and protective storage bins for harvest crops, such as dry grains, or the like which materials are amenable to more or less flowing piling.

Among the several objects of the invention may be noted the provision of a low-cost light-weight and strong storage bin for farm products such as grain and the like which have a more or less flowing characteristic when piled; the provision of a bin of the class described, the form of which is flexible and adapted to be compacted into minimum space within a small package for storage of the bin during nonuse; the provision of a bin of the class described which is self-erecting in the field during filling operations; and the provision of a bin of this class which in construction is resistant against rot, mildew, moisture, rodents and vermin and which is adapted conveniently to protect quantities of grain during the harvesting season which otherwise might need to be stored on the ground and in the open. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a top plan view of our new bin shown collapsed and empty;

Fig. 2 is a side elevation showing the bin coupled to a filling spout preparatory to filling for self erection;

Fig. 3 is a side elevation showing the bin as filled and self-erected in the filling process;

Fig. 4 is a schematic sectional view illustrating certain preferable angular relationships between parts;

Fig. 5 is a plan view of a separated bin bottom;

Corresponding reference characters indicate corresponding parts throughout the several view of the drawings.

Figure 1:
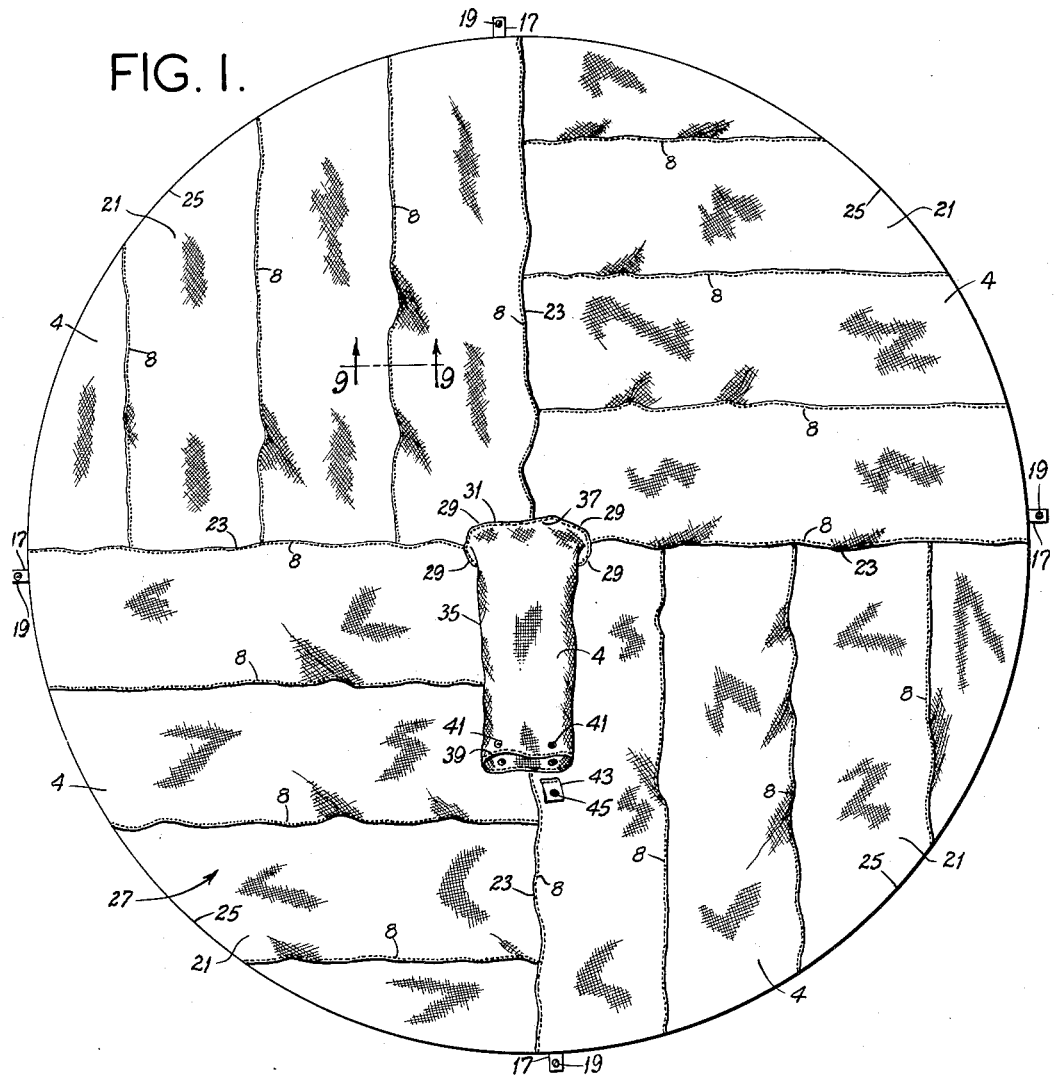

During harvesting periods, produce, particularly grain, is often so rapidly collected that there may not be immediately available sufficient space in commercial elevators or in other permanently protected storage areas. As a result, quantities of grain may be lost or impaired in value by open piling in the field. Attempts have heretofore been made to improve this state of affairs by locating groups of rigid storage bins near a field of operations, these being composed of wood, metal or the like. Such bins not only have a high first cost but also entail a large overhead cost because of the minor fraction of the year over which they may be used, for as soon as possible after a harvesting season the grain is disposed of. It is also inconvenient to bring such bins into the closest desirable proximity to the harvesting area. Moreover, they are inconvenient to load and unload.

Briefly, our invention consists in the provision of a storage bin composed of flexible material made up in the form of a flat-bottomed cone-like or pyramidal shape (when filled), and which is collapsible when empty so that it may be put into a bundle for storage over the winter, or which, if necessary, can be left filled in the field for indefinite periods until the stored grain can be otherwise disposed of. The patterns for the main parts are of elementary flat shapes which are convenient to produce either in integral areas of material (if available) or strips of multi-ply material joined by water-resistant seaming.

Referring now more particularly to the drawings, there is shown at numeral 1 (Fig. 5) a round bottom composed of a flexible material. While this material may be made of a single piece of flexible sheeting such as one of the known flexible sheeting such as one of the known flexible plastic sheets, or of water-resistant woven fabric, either single-ply or multi-ply, it is preferable for purposes of economy, and in view of the relatively usual large size of the bin, that it be composed of multi-ply strips such as shown at 3, 5, 7, 9, 11, 13, joined at waterproof sewn seams 15. The plies of a suitable multi-ply material may be paper attached to burlap by means of asphalt or a similar water-resistant adhesive. Extending from the periphery of the bottom 1 are attached tabs 17, which may be sewn on and which incorporate grommeted openings 19. At numeral 21 (Fig. 6) is shown one of four side segments, composed of similar material and having edges 23 adapted to be seamed one to another to form a cone (as will appear). The long circular margins 25 of the segments 21 are seamed to the margin of the bottom 1. The short circular margins 29 of cone segments 21 form a circle 31.

Figure 7:
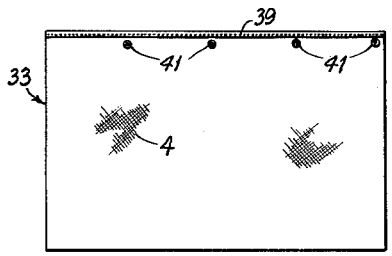
Fig. 7 is a developed view of a neck piece.

Fig. 7 shows the developed rectangular form 33 of a flexible piece which by means of a seam 37 at the circle 31 is attached to the margins 29 of the segments 21, thus forming a flexible tubular loading and unloading neck 35. The upper end of the neck 35 is provided with a selvage of any suitable form, for example by means of a stitched hem, as indicated at 39. Below the hem are located grommets 41 providing openings. Attached at a suitable point on the cone 27 is a tab 43, also having a grommeted opening 45.

Figs. 1–3 illustrate the operation of the bin, which is as follows:

After removing it from a package into which it may have been rolled or folded, it is spread out as shown in Fig. 1, with the bottom 1 stretched upon the ground, the cone 27 and the neck 35 being at this time limp and lying on the bottom. The margins may then be staked down by driving pegs 2 through the grommeted openings 19 of the tabs 17. Suitable suspension means, hereinafter called suspenders 47 (Fig. 2), are attached to the grommets openings 41 and the neck 35 is pulled up over the end of a filling spout 49, such as forms a part of standard grain loaders or combines. As the grain flows from the spout 49 through neck 35, it forms a central, growing heap on the bottom 1 which, as the heap rises and increases in diameter, automatically erects and fills the bin, until it appears as shown in Figs. 3 and 4.

Certain optimum arrangements are diagrammatically illustrated in Fig. 4, wherein G shows the ground upon which the bottom 1 rests. Dry grain such as wheat, when poured into a pile, assumes a certain angle of repose indicated by R in Fig. 4. The included angle M between the bottom 1 and cone 27 (when the latter is taut) is preferably made slightly greater than the angle R, as indicated. For example, if the angle R is about 30° (as in the case of wheat) then the angle M should, for example, be 40°. The result is that when the grain is poured in as indicated by the dotted lines and stippling W, it will, as the central pile grows, initially force its way completely out of the corners 51 without pocketing air. Air as at S is gradually eliminated by exit past the incoming grain through the neck 35, with the result that the bin becomes self-erecting and completely filled without air pocketing. This produces a slightly bulged form of loaded bin but without appreciable side-bursting pressure. For example, in the case of a bin holding 600 bushels of wheat, of about 18 feet in diameter and about 6 feet high up to the filling neck where the angle R is about 30° and the angle M is 40°, the side pressure is on the order of 1 p. s. i. For minimizing pressure the value of angle M should be near that of angle R. A satisfactory range for angle M, for dry grain crops in general, is from 20° to 70°. The importance of these features lies in the ample strength which may be obtained without the employment of excessively thick, bulky or costly wall materials for parts 1, 27 and 35.

After the bin has been filled up to the point 31, the neck 35 is lowered from the spout 49 and the suspenders 47 are removed. The empty neck is then turned down, as shown in Fig. 3. Since its opening then points downward, it inherently deflects rain water from entry. However, to prevent tampering or entrance of rodents, a tie wire may be threaded through the grommets 41 so as to pinch shut the neck 35 and then through the grommeted opening 45 of the tab 43. A lead seal, such as shown at 53, may be employed, particularly where government inspection is involved.

When it is desired to remove grain, the neck 35 may be reopened and a suction neck employed for the purpose; or, if desired, a side may be gashed as by slashing, or by opening a seam. In the former case the bin may be reused. In the latter case it may be disposed of or reseamed.

It will be understood that, while each type of grain to be stored has a different angle of repose R, which might appear to require a different angle M, this is not in fact necessary, since the angle M may be made larger than the greatest angle of repose of the grain which is expected to be stored in a given production of bins. Moreover, the angles of repose of different grains are not excessively different for our purpose. It should also be understood that while the disclosed angle arrangement is preferred, it is not absolutely necessary for obtaining advantages of the broader features of the invention.

Figure 8:
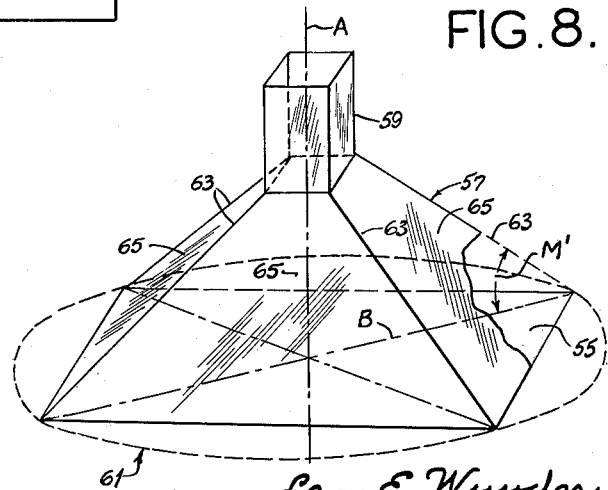
Fig. 8 is a diagrammatic broken-away view illustrating an alternative embodiment of the invention.

It will also be clear that the shape of the bottom of the bin, instead of being round, may be polygonal. Thus it may be constructed to have a pyramidal upwardly converging form of three or more flat sides on a polygonal bottom having a corresponding number of three or more sides. Such a modification is indicated in diagrammatic Fig. 8, wherein a four-sided pyramidal form is shown. The bottom is numbered 55, the assembly of converging flat-sided panels 65 and the neck 59. It is preferable in this form of the invention that the polygon which determines the outline of the bottom 55 should be inscribed within a circle 61, the diameter of which is that of the base of an unconfined pile of dry grain of volume equal to that of the capacity of the bin. Then if the angle M' (located in a vertical plane containing axis A, and measured between a horizontal line B and a ridge line 63 coincident with a corner 57 between panels 65) is greater than the angle of repose, no air pocketing will occur. As indicated in Fig. 8, the angle M' is in a vertical plane containing the vertical axis A of the pyramid. The intersection of any other plane containing this axis A and one of the panels 65 is at a greater angle to the horizontal. Hence if the angle of repose of the contained grain is less than M', it is less than any of these angles and air pocketing will not occur.

In order to avoid circumlocution, the term "conical" is intended in a broad sense to refer to both round and polygonal forms of the invention, the common feature being the flexibility and the convergence from the flat bottom up to the neck.

It will be understood in connection with the Fig. 8 form of the invention that the various features already described in connection with constituent materials apply thereto. The same alternatives of manufacture from integral or multi-ply seamed sheets will be seen obviously to apply. Seaming between panels 65 will be along the ridge lines 63 between them. The opening to which the neck 59 attaches, and the neck itself, will preferably be of polygonal form. The features already described in connection with grommeted tabs for holding down the bottom, pulling up the neck and fastening it shut when turned down are all applicable.

Regarding the character of preferred multi-ply sheeting, it is made water-, mildew-, vermin- and rodent-resistant, as are also the seams, by means already known in the multi-ply sheet making art. For example, there is available multi-ply sheeting consisting of strong paper (which may be crinkled or creped) attached by asphalt to burlap. Such material is water resistant. The burlap and/or paper may be treated to repel vermin and rodents. It will be understood that the paper layer is located on the inside of the bin.

Figure 9:
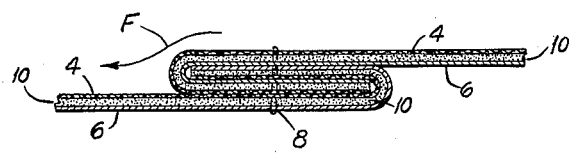
Fig. 9 is a diagrammatic cross section taken on line 9—9 of Fig. 1, illustrating a seam arrangement.
Figure 6:
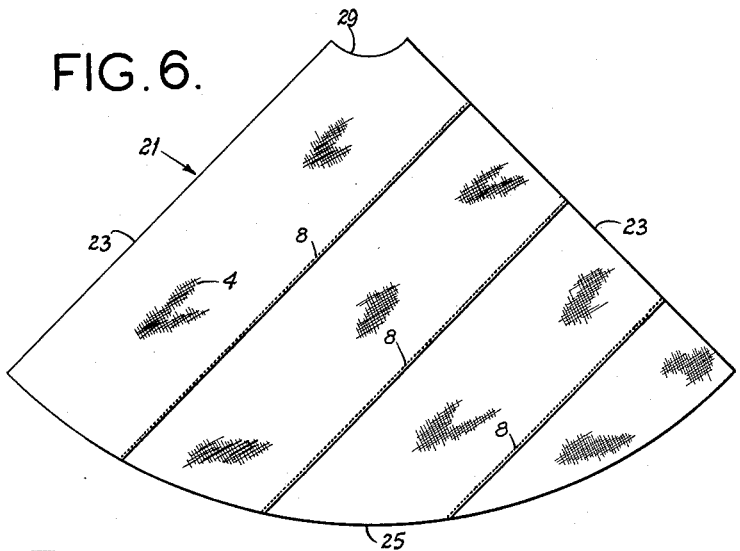
Fig. 6 is a developed view of a separated side segment.

It will be noted from Fig. 6 that the strips of multi-ply fabric which form each wall segment have their lengths parallel to one straight segment edge which becomes a straight-line element of the finally erected cone. These strips are perpendicular to the other segment edge. This causes the longitudinal joining seams between strips in a given sheet to assume an approximately helical position on the conical form of the bin when filled. Then the seams between strips, if sewn, may be shingle-lapped so that water flows over instead of into the seams when progressing down the conical form. While any of various types of lapped sewn seams may be used, a so-called felled type interlocking seam is desirable. Such a seam is diagrammed in Fig. 9, wherein the outer woven fabric layer is diagrammed at numeral 4, the inner paper layer at 6 and the stitching at 8. The asphalt joining the woven and paper layers 4 and 6 is shown by stippling indexed 10. The arrow F on Fig. 9 shows the direction of water flow-off over this seam when the bin is erected. Thicknesses of parts in Fig. 9 are exaggerated for clarity. The seams may have a single or multiple lines of stitching.

While a present important use of the invention is for comminuted flowable material such as grain, it will be understood that it is useful for storing similar comminuted flowable materials such as cement and even larger sized items, such as peas, peanuts and the like, or even potatoes, sugar beets or any other products that may be dropped into a pile for storage. One of the important features of the invention is the provision of a large-size flexible bin so shaped that large masses are safely contained and do not apply excessive forces to the bin in a destructive manner.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

We claim:

1. An erectile and collapsible protective storage bin for flowable dry materials comprising a water-resistant flexible bottom sheet, water-resistant flexible side wall sheet portions attached to and extending convergently upward from the margins of the bottom to form an inlet, a water-resistant flexible loading neck sheet attached to and extending from said inlet, hold-down means attached near the margins of the bottom and side wall portions adapted to receive hold-down ground pegs, an assembly of means on the loading neck for attaching a suspender adapted to hold said neck in connection with a filling spout, and attachment means on a wall portion, which attachment means and said assembly of means on the loading neck are adapted to receive a tie for gathering the neck and holding the neck in downwardly directed weather-deflecting position on a side portion when the bin is loaded.

2. An erectile and collapsible protective storage bin for flowable dry materials comprising a bottom formed of flexible strips of material joined at water-resistant seams, upwardly converging panels peripherally joined to said bottom, each panel being of segmental form and composed of flexible strips of material joined at water-resistant lapped seams, the strips being so arranged in the respective panels that the laps of the seams within a panel are downwardly shingled on the sloping surfaces of the panels when the bin is erected, and a flexible tubular loading neck joined to the upper ends of said panels, said loading neck having a normally open outer end for the reception of materials to be stored in the bin.

3. An erectile and collapsible storage bin for dry comminuted flowable materials comprising a circular bottom, and upwardly converging wall segments having radial margins joined to one another to make a converging conical form, the larger end of which form is peripherally attached to the circular bottom, said form having a relatively small opening in its other end for the reception of said materials, a loading neck having a normally open outer end and forming a tubular extension from said small opening, each of said wall segments being composed of strips of water-resistant sheeting joined at water-resistant lapped seams, the lengths of said strips in any one segment being parallel to one of its margins and arranged crosswise of the other margin, the laps of the seams within each segment being downwardly shingled on the sloping surface of the segment when the bin is erected.

4. An erectile and collapsible storage bin for dry comminuted flowable materials comprising a flexible bottom, upwardly converging wall segments joined to one another to make a converging form, the larger end of which form is peripherally attached to the bottom, said form having a smaller opening in its other end, and a loading neck forming a tubular extension from said small end opening, each of said bottom, wall segments and loading neck being composed of flexible water-resistant sheeting, the sheeting of at least each converging wall segment being composed of strips of material joined at water-resistant lapped seams, the laps of the seams within each segment being downwardly shingled on the sloping surface of the segment when the bin is erected.

5. An erectile and collapsible protective storage bin for flowable dry materials comprising a water-resistant flexible bottom sheet, water-resistant flexible side wall sheet portions attached to and extending convergently upward from the margins of the bottom to form an inlet, a water-resistant flexible tubular loading neck attached to and extending from said inlet, said neck having an outer normally open end, a plurality of reinforced openings arranged around said neck adjacent said normally open outer end adapted for the attachment of suspenders for holding said neck in telescoping connection with a filling spout and adapted also to receive means to gather the neck at said open end to effect at least partial closure of said normally open outer end, said neck being adapted to lie with its partially closed opening directed downward in weather-deflecting position on said side wall sheet portions.

6. An erectile and collapsible storage bin for dry comminuted flowable materials comprising a circular bottom, upwardly converging wall segments joined to one another to form an upwardly converging cone of circular cross section, each wall segment comprising substantially a 90° sector, the larger end of said cone being marginally attached to the bottom, said cone having a circular smaller opening at its upper end, and a flexible cylindrical loading neck attached at said smaller end opening, each of said bottom, wall segments, and loading neck being composed of flexible water-resistant sheeting, the sheeting in each segment being composed of strips of material joined at water-resistant lapped seams arranged parallel to a first side of the segment and perpendicular to the second side, the laps of the seams being so arranged within a segment that they are downwardly shingled on the sloping surfaces of the segments when the bin is erected, and seams connecting said first and second sides of adjacent segments.

References Cited in the file of this patent

UNITED STATES PATENTS

| | | |
|---|---|---|
| 446,518 | Hesser | Feb. 18, 1891 |
| 1,137,303 | Carpenter | Apr. 27, 1915 |
| 1,143,512 | Cruson | June 15, 1915 |
| 1,206,041 | Slataper | Nov. 28, 1916 |
| 1,716,403 | White | June 11, 1929 |
| 2,211,958 | Mahaffey | Aug. 20, 1940 |
| 2,423,940 | Krupp | July 15, 1947 |
| 2,426,195 | Geraci | Aug. 26, 1947 |
| 2,507,939 | Smith | May 16, 1950 |
| 2,638,951 | Smith et al. | May 19, 1953 |

FOREIGN PATENTS

| | | |
|---|---|---|
| 117,765 | Australia | Nov. 12, 1943 |